Dec. 29, 1970     W. RAST     3,550,424

TUBE EXPANDER

Filed June 12, 1968     4 Sheets-Sheet 1

INVENTOR
Wlodzimierz Rast
By Oldham and Oldham
Attys

Dec. 29, 1970  W. RAST  3,550,424
TUBE EXPANDER

Filed June 12, 1968  4 Sheets-Sheet 2

Inventor
Wlodzimierz Rast
By Oldham and Oldham
Attys.

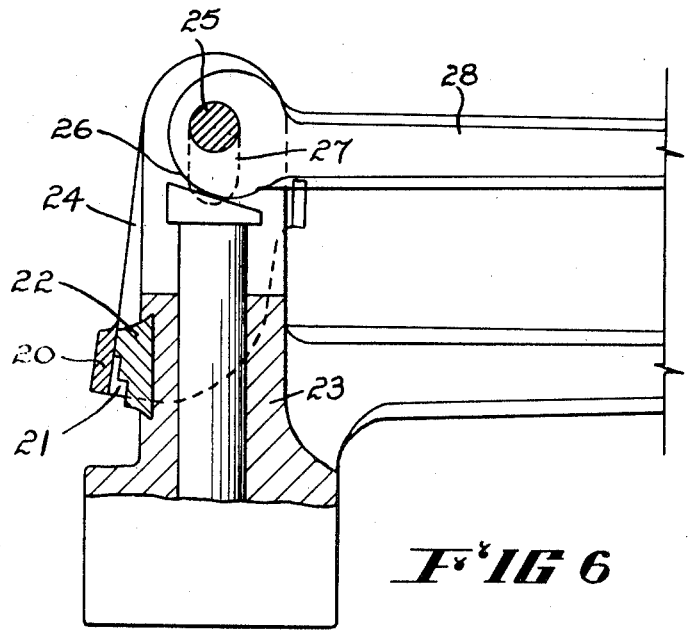
FIG 6
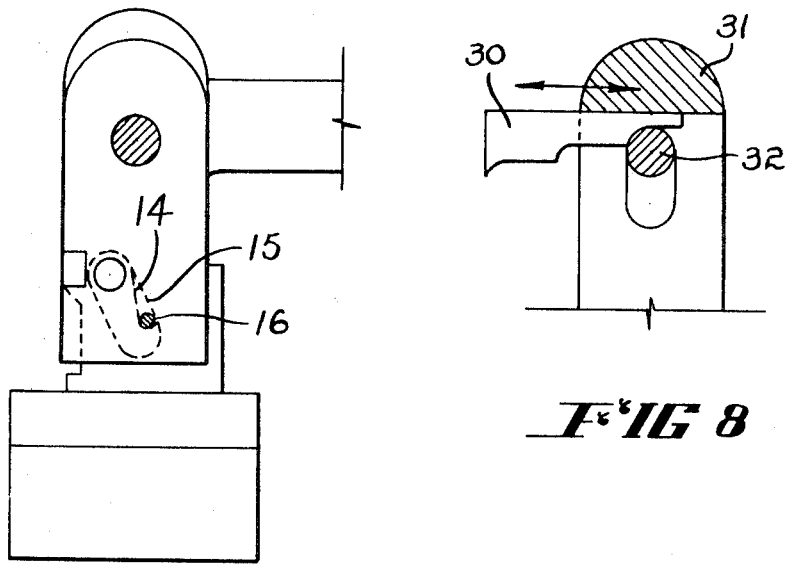
FIG 7
FIG 8

United States Patent Office 3,550,424
Patented Dec. 29, 1970

3,550,424
TUBE EXPANDER
Wlodzimierz Rast, 38 Hillcrest Drive, Eden Hills,
Adelaide, South Australia 5050, Australia
Filed June 12, 1968, Ser. No. 736,532
Int. Cl. B21d 39/08
U.S. Cl. 72—399                        8 Claims

ABSTRACT OF THE DISCLOSURE

A tube expander of the type having expansible jaws operated by a tapered pin characterised in that a mechanism which operates the pin to separate the jaws is operable in stages to allow at least two strokes of an arm for full movement.

Figure 1:
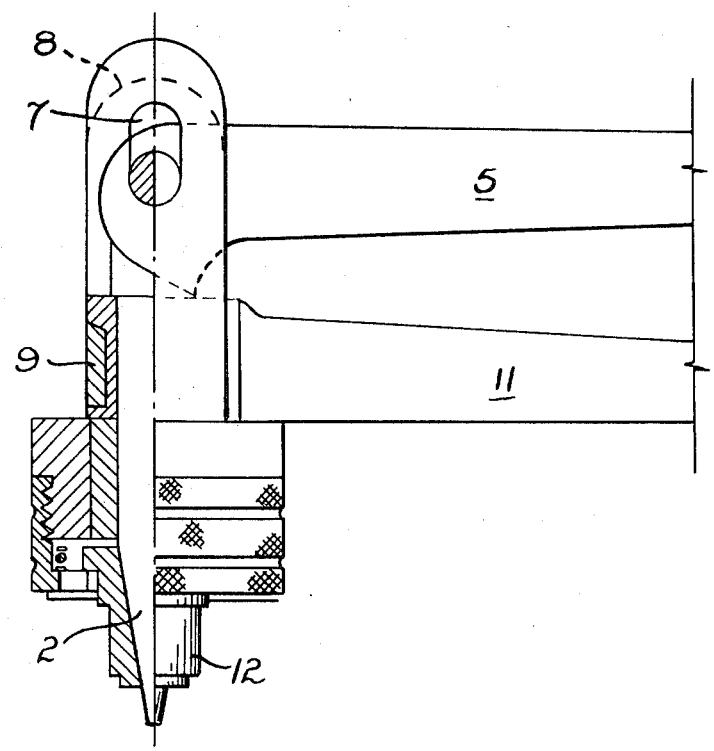

This invention relates to a tube expander and in particular it relates to improvements to an expander of the type in which jaws are forced apart by means of the tapered pin actuated by a lever mechanism, whereby when the jaws of the expander are positioned in the end of a tube and the pin is appropriately moved the end of the tube will be expanded by a measured amount.

This type of expander is widely used in plumbing and similar work where tubes require to be joined or where the ends of the tubes require to be expanded to take fittings.

It will be realised that considerable force must be exerted on the jaws during the expanding action and also that there are problems of accessibility to the ends of the tube in some cases so that it has been proposed heretofore to form an expander comprising jaws mounted on a removable member to allow jaws of different dimension to be fitted, the member being mounted on a body which carries the expanding pin for the jaws and has one handle on it, the body carrying also a second movable handle which has on it or actuates a cam or similar mechanism by means of which the pin can be driven inwards into the jaws to expand the jaws due to the taper on the pin.

The handles preferably project from one side of the unit, that is generally at right angles to the pin so that the expander can be inserted into the ends of tubes where little space is available.

One of the problems with expander of this type is the force which is required to move the pin through the jaws during the expanding action, and for this purpose the levers have had to be of substantial length to give the mechanical advantage necessary to drive the pin into the jaws.

Another problem which is also occasioned by the force required to move the pin is the extent of movement of the movable handle in relation to the other handle to give sufficient movement to the pin with a cam of reasonably low contour so as to get the maximum force on the pin, this effect making it somewhat more difficult to manipulate the expander in confined spaces.

It is the object of this invention to provide an expander in which the pin can be moved in a more ready manner, a further object being to reduce either the motion or the size of the operating levers to allow better access to difficult sites and also generally to lighten the work of the operator when expanding tubes, particularly tubes of substantial diameter where correspondingly greater pressures are required.

The objects of the invention are achieved by so arranging the operating mechanism for the pin that instead of the pin being actuated during a single stroke of the operating mechanism, action is in stages so that the pin can be moved progressively into the jaws by more than one pressure movement of the mechanism.

This means that in the case of a cam, a cam of lower profile can be used so that during each stroke the pin is moved only a short distance, the cam support being however so arranged that there is a progressive inward movement of the cam itself to move the pin for the required distance when the number of strokes required for this purpose have been effected.

Thus the tube expander according to this invention can conveniently comprise a body having a fixed and a movable arm thereon and said body carrying expansible jaws operated by a tapered pin through a cam on the operating arm, characterised in that the mechanism for moving the pin through the said operating arm is arranged for stage operation whereby movement of an operating arm first moves the pin partway into expanding jaws and repeated operation of the operating arm completes the movement of the pin in the jaws for full expansion.

In order however that the invention will be fully appreciated, embodiments will now be described, but it is to be clear that the invention need not necessarily be limited to these, the scope being defined in the claims herein.

Figure 2:
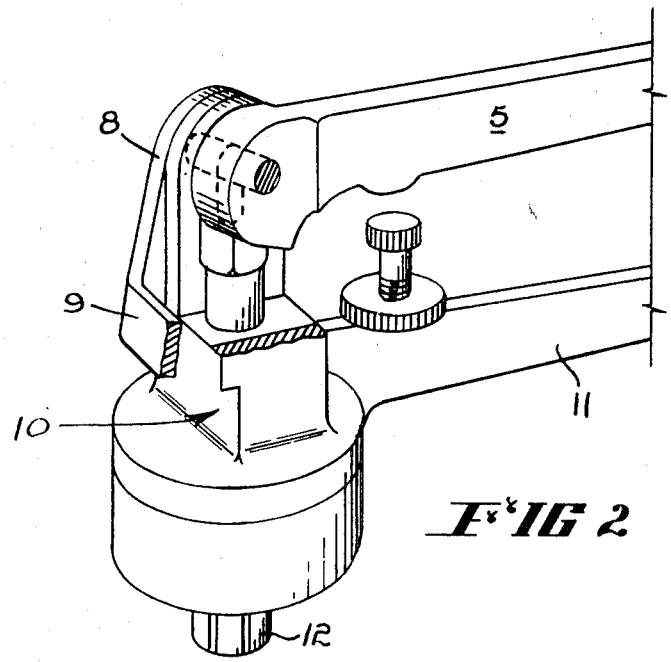
Figure 3:
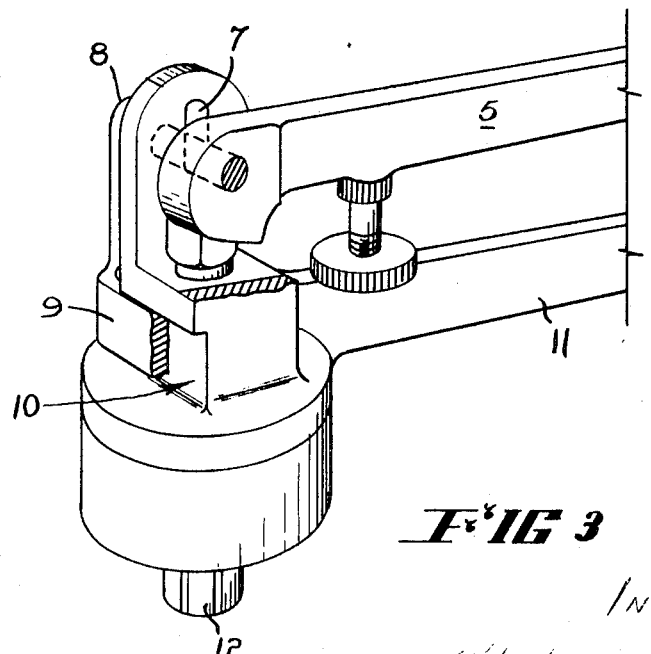
Figure 4:
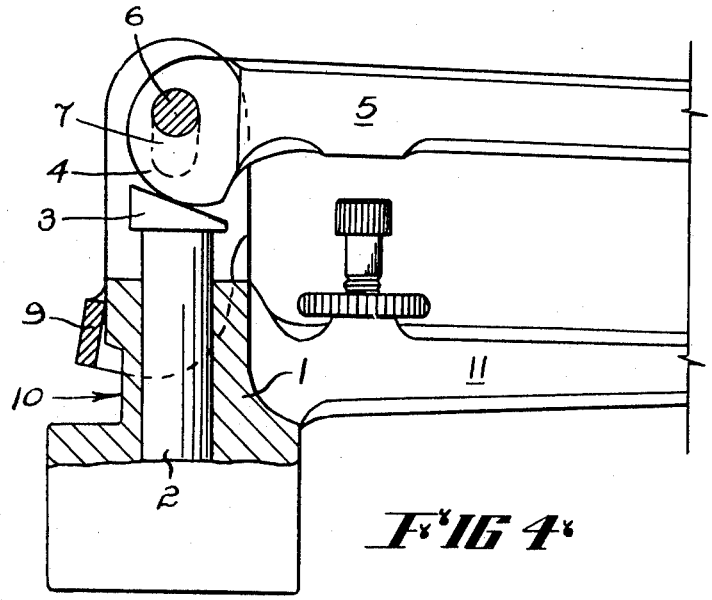
Figure 5:
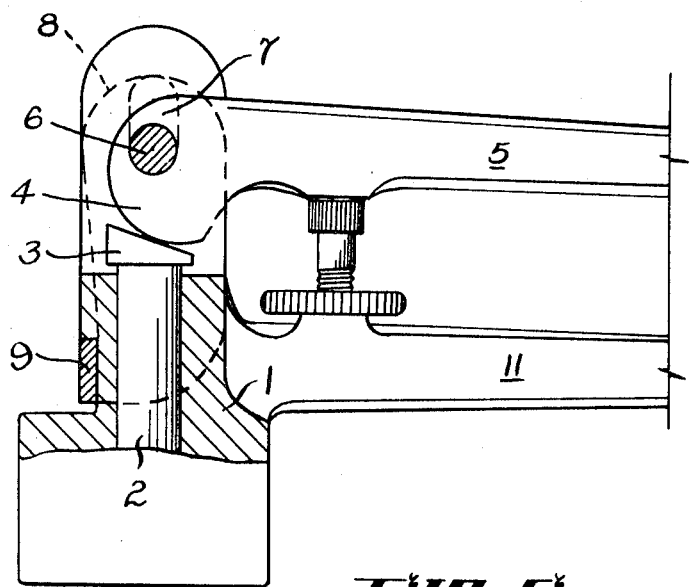

In the drawings:

FIG. 1 is a part-sectional side elevation of a simple form of the invention having a two-stage expander movement, FIG. 2 is a sectional side elevation of the expander at the completion of the first stage movement, FIG. 3 is a view similar to FIG. 2 but showing the expander at the completion of the second stage movement, FIGS. 4 and 5 are sectional views of the mechanism in the positions corresponding to FIGS. 2 and 3, respectively, FIG. 6 is a view of a modified form using a series of stages, FIG. 7 shows how a loading spring can be incorporated between the staging clip and the head of the expander, and FIG. 8 is a modified way of moving the pivot pin.

Referring first to FIGS. 1 to 5 inclusive, a body 1 has in it a movable pin 2 having a head 3 in engagement with a cam 4 on a movable handle 5 pivoted to the body 1 by a pin 6 operating in a slot 7 in the body 1.

The pin is however located in the slot by a staging clip 8 which has a crossbar 9 which is capable of engaging a notch 10 in the body for second stage movement.

Thus the pin 6 is in the position shown in FIG. 4 during first stage movement, that is at the outer end of the slot 7, but is held at the inner end of the slot 7 for second stage movement by the crossbar 9 of the staging clip 8 engaging the notch 10 in the body.

The fixed arm is designated 11 and the jaws of the chuck 12, these jaws being of usual construction and spread by a taper on the pin 2.

A spring 14 confined in a socket 15 in the body (FIG. 7) engages a pin 16 on the staging clip to urge the staging clip inwards to ensure engagement of the crossbar 9 on the notch 10.

It will be realised that a simple two-stage movement will give considerable advantage over the present method of operating the pin by a single action, but similarly a series of movements can be used where still greater leverage is required, the mechanism for achieving this being simply obtained by having a staging clip crossbar 20, see FIG. 6, engageable in any one of a series of notches 21 in a member 22 secured to the body 23 to retain the crossbar for the second and subsequent stages, the staging clip 24 being coupled to the pin 25 on which the cam 26 operates, this pin being guided in a slot 27 in the body as described earlier to thereby allow the pin 25 to start in an outermost position and after manipulation of the cam 26 by the lever 28 the pin 25 can be moved inwardly either by the operator or under spring or other control until the staging clip crossbar 20 engages the first of the notches 21 in the member 22, and the second stroke can then be effected which drives the pin the required further distance.

The notches 21 could be formed in the body 23 itself but preferably are formed in a hardened member 22 secured in the body as illustrated.

It will be realised of course that it would not be essential to move the pivot pin of the cam inwards progressively to attain the required length of movement of the tapered pin which actuates the jaws because means could be interposed between a cam or other operating mechanism which would give this multistage actuation of the tapered pin.

It would for instance be possible to fix the pivot pin of the cam to the body and to have a wedge shaped member 30 interposed between a face 31 and the pivot pin 32 on the body 33, see FIG. 8, which wedge shaped member could be moved in a further stage after completion of each stroke of the cam until the required movement of the tapered pin was completed.

Similarly, it will be realised that means can be provided for the staging clip which would bring the staging clip out of engagement with a notch in which it was engaged after the tapered pin reaches its final position and expansion of a tube has been completed.

By allowing two or more strokes to give the complete expansion, it will be obvious that shorter operating handles or similar mechanisms can be used as the cam or member which forces the tapered pin into the jaws can have a lower profile or mechanical advantage, thus making the operation of levers or the like very much simpler by firstly shortening the length of such levers and secondly enabling a much lower movement of the movable lever to be used so that the expander can be used better in confined spaces and by the application of lesser pressures from the operator.

To control the actual distance to which the pin can move it is convenient to fit adjustable stop means on one of the levers which will be contacted by the other lever when the final position of the tapered pin has been reached.

From the foregoing it will be realised that the improvement to the expander consists in the provision of a multistage actuating mechanism which allows the tapered pin to be advanced in smaller stages during each manipulation of operating handles or the like.

What is claimed is:

1. An expander of the type comprising a body supporting expansible jaws and movable therein, a tapered pin adapted to expand the jaws by axial movement of the pin, characterised by a fixed arm on the said body and a movable arm pivoted on the said body, said movable arm having a cam to engage the said tapered pin and being mounted on a pivot pin which is carried by the said body but is positionable at various distances from the said tapered pin but lockable in such positions whereby by repeated manipulation of the movable arm, but using progressively closer positions of the pivot pin the jaws can be progressively expanded.

2. A tube expander comprising a body having a fixed and a movable operating arm and carrying expansible jaws operated by a tapered pin through a cam on the operating arm, the operating arm and cam forming the mechanism for moving the pin, characterized in that the mechanism for moving the pin by means of the said operating arm is arranged for stage operation whereby movement of the operating handle just moves the pin part way into the expanding jaws and repeated operation of the handle completes the movement of the pin in the jaws for full expansion.

3. An expander according to claim 2 characterized in that the body has said fixed arm integral therewith and slidably carries said tapered pin, the operating arm being mounted on a pivot pin engaging slot means in the said body to allow the pivot pin to move toward or away from the said tapered pin, and by a staging clip connected to the said pivot pin and adapted to engage a notch or notches on the said body to fix the operating position of the pivot pin in the said slot means.

4. An improved tube expander according to claim 3 wherein the staging clip has a cross bar adapted to engage a said notch in the body to give a second actuation of the tapered pin when the pivot pin is positioned at the end of the said slot nearest the tapered pin, but wherein the initial movement of the movable operating arm takes place when the staging clip is disengaged from the said notch in the body to allow the pivot pin to be positioned in the end of the said slot means remote from the tapered pin.

5. A tube expander according to claim 3 characterized by spring means to move the staging clip into contact with the body to facilitate automatic engagement of the staging clip with a notch or notches in the body.

6. A tube expander according to claim 3 wherein a series of notches are formed in a member carried by the said body.

7. An expander according to claim 2 characterized in that one of said arms extends from the body substantially at right angles to the axis of the tapered pin, a pivot pin positions the operating arm on the body, and in that the tapered pin has a head adapted to engage said cam on the said movable operating arm, and in that said cam is on an end of the movable arm that engages the pivot pin, which pivot pin is adjustable in its distance from the head on the tapered pin and can be held in at least two positions whereby by actuating the moving arm when the pivot pin is in a first position the tapered pin can be moved part way into the expander jaws but on repositioning the pivot pin the tapered pin can be moved further into said jaws.

8. An expander as in claim 1 where said body has an axially extending slot therein in which said pivot pin is received and initial movement of said movable arm occurs with said pivot pin at an end of said slot remote from said tapered pin, and cooperating lock means are operatively positioned on said pivot pin and said body to position said pivot pin at the end of said slot nearest said tapered pin for secondary movement of said movable arm.

References Cited

UNITED STATES PATENTS

| 1,483,714 | 2/1924 | Brooks | 72—452 |
| 1,920,302 | 8/1933 | Grotnes | 72—452 |
| 1,997,323 | 4/1935 | Strnad | 72—370 |
| 2,828,538 | 4/1958 | Darden | 72—370 |

CHARLES W. LANHAM, Primary Examiner

G. P. CROSBY, Assistant Examiner

U.S. Cl. X.R.

72—452